United States Patent [19]
Ohba et al.

[11] Patent Number: 5,248,867
[45] Date of Patent: Sep. 28, 1993

[54] ELECTRIC SPARK MACHINE

[75] Inventors: Nobuaki Ohba; Toshimi Furuta, both of Aichi, Japan

[73] Assignee: Mitsubishi Denki K.K., Tokyo, Japan

[21] Appl. No.: 795,843

[22] Filed: Nov. 21, 1991

[30] Foreign Application Priority Data

Nov. 30, 1990 [JP] Japan ................... 2-330409

[51] Int. Cl.$^5$ ............... B23H 7/22; B23H 7/20
[52] U.S. Cl. ................ 219/69.15; 364/474.18; 483/9
[58] Field of Search ........... 219/69.11, 69.13, 69.15, 219/69.16, 69.17; 33/551; 483/9; 364/474.04, 474.17, 474.18, 474.21; 204/224 M

[56] References Cited

U.S. PATENT DOCUMENTS

| | | | |
|---|---|---|---|
| 4,588,339 | 5/1986 | Bilz | 483/9 |
| 4,592,146 | 6/1986 | Campbell | 33/551 |
| 4,596,066 | 6/1986 | Inoue | 219/69.15 |
| 4,742,470 | 5/1988 | Juengel | 364/474.17 |
| 4,922,591 | 5/1990 | Campbell . | |
| 5,046,014 | 9/1991 | Anjo | 364/474.21 |

FOREIGN PATENT DOCUMENTS

| | | | |
|---|---|---|---|
| 0094105 | 11/1983 | European Pat. Off. . | |
| 155662 | 9/1985 | European Pat. Off. | 483/9 |
| 0155662 | 9/1985 | European Pat. Off. . | |
| 283430 | 9/1988 | European Pat. Off. . | |
| 58-211824 | 12/1983 | Japan | 219/69.16 |
| 59-227329 | 12/1984 | Japan | 219/69.17 |
| 63-114823 | 5/1988 | Japan | 219/69.13 |
| 63-134125 | 6/1988 | Japan | 219/69.13 |

OTHER PUBLICATIONS

Gerhard Taubitz "Werkzeug-Identifikation statt Datentransfer uber Lochstreifen", Werkstatt und Betrieb 120 (1987) 11, pp. 919-921.
Volker Horn "Werkzeuge beruhrungslos identifizieren", Werkstatt und Betrieb 120 (1987) 2, pp. 121-122.
"Einstell- und Mebgerat H321 fur Erodieranlagen", Werkstatttechnik 80 (1990) 11, p. 628.
Fran Birzer "Synergie und Wettbewerb beim erosiven Senken und Schneiden", Werkstatt und Betrieb 123 (1990) 7, pp. 539-550.

Primary Examiner—Geoffrey S. Evans
Attorney, Agent, or Firm—Sughrue, Mion, Zinn, Macpeak & Seas

[57] ABSTRACT

An electrode for use in an electric spark machine has recording means integral therewith which stores an electrode information unique to the electrode. The electric spark machine reads the electrode information when the electrode is mounted thereon and stores it in a memory. The electric spark machine operates according to a machining program contained in the electrode information read from the memory while correcting misalignment of the electrode according to misalignment information contained in the electrode information.

8 Claims, 10 Drawing Sheets

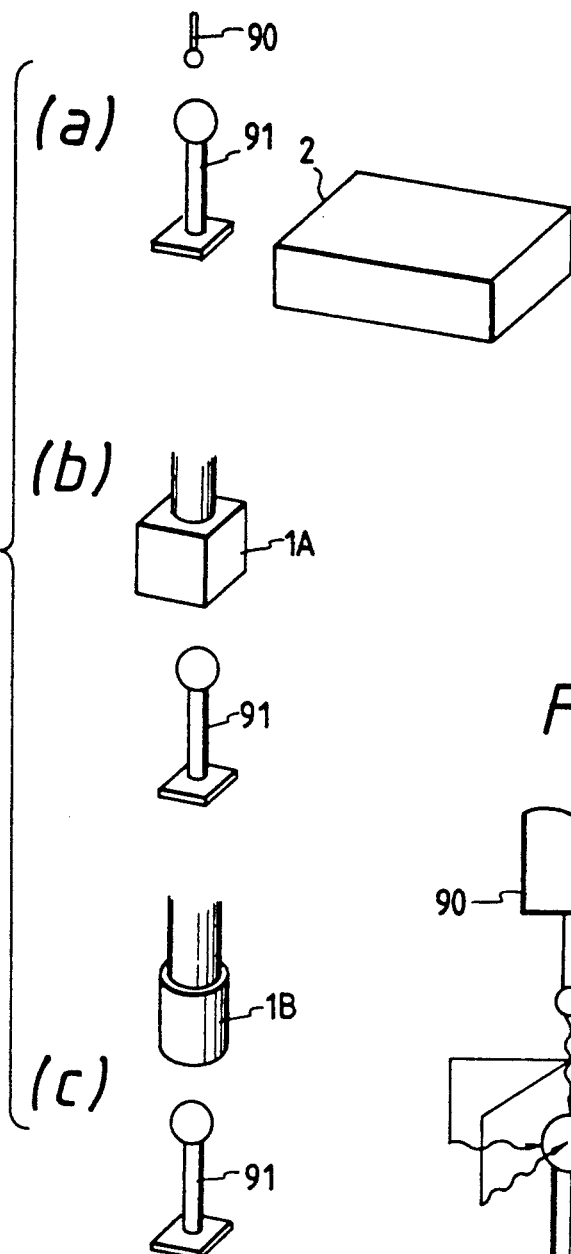
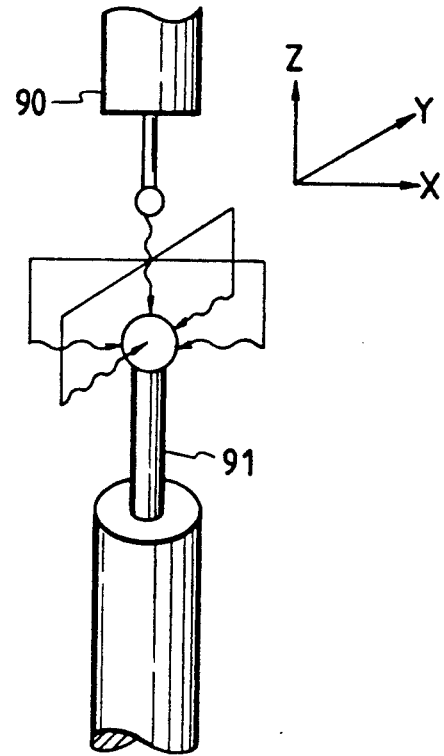
FIG. 10
FIG. 11

| Zb FACE | Xa FACE | Xb FACE | Yb FACE | Ya FACE |

(a) → (b) → (c) → (d) → (e)

ELECTRIC SPARK MACHINE

BACKGROUND OF THE INVENTION

The present invention relates to an electric spark machine and an electrode to be used in such electric spark machine as a tool, which is effective in managing information concerning the electrode.

FIG. 8 shows schematically an example of a conventional electric spark machine and FIG. 9 is a side view showing details of a main portion thereof. In FIGS. 8 and 9, a reference numeral 1 depicts a spark machining electrode, 2 a workpiece to be machined by the electrode 1, 3 a machining tank, 4 machining liquid such as insulating oil, etc., filling the machining tank 3. Usually, machining which uses electric spark machine is performed within the machining liquid 4 in the tank 3. A reference numeral 5 depicts a pulse current generator for supplying pulsed current to the electrode 1 and the workpiece 2, 8a depicts a lead screw for moving a main shaft of the spark machine vertically (in Z axis direction), 8c depicts a screw for moving the workpiece 2 in an X axis direction, 9a depicts a servo motor for rotating the lead screw 8a in the Z direction, 9b depicts a servo motor for rotating a lead screw (not shown) for moving the workpiece in the Y direction, 9c depicts a servo motor for rotating the lead screw 8c in the X direction and 10 depicts a numerical control device for controlling operations of the respective servo motors 9a, 9b and 9c according to a machining program.

A reference numeral 11 depicts a head positioned in an upper portion of the electric spark machine, 12 depicts a column which is a frame fixedly supporting the head 11 and 13 depicts a bed which is a base table of the electric spark machine 14b a movable table for moving the workpiece 2 in the Y direction together with the machining tank 3 and 14c represents a movable table for moving the workpiece 2 in the X direction together with the tank 3. Numeral 5 depicts a spindle head which is a center rod of the main shaft of the electric spark machine on a lower end of which an electrode clamper 15a is for provided clamping the electrode 1 through an electrode angle regulation mechanism 19 for rotating the electrode 1 around an axis of the spindle head (C axis direction). A reference numeral 16 depicts an automatic electrode exchange device for replacing the electrode 1 mounted on the main shaft with another electrode, 17 represents an arm for holding the electrode 1 for replacement thereof and 18 represents a magazine rack which can store various electrodes 1. The electrode 1 is mounted on a shank 20 in order to facilitate an automatic replacement of electrode.

In operation, the electrodes 1 fixedly mounted on the respective shanks 20 are preliminarily stored in the magazine rack 18. The magazine rack 18 has a number of storing portions which are numbered serially. The serial numbers are used as instruction numbers from the numerical control device 10 to identify the perspective electrodes 1. Upon receipt of such instruction number from the numerical control device 10, the magazine rack 18 is rotated to a position in which an electrode 1 stored in the correspondingly numbered storing portion can be caught by the arm 17. Then, the arm is extended leftwardly in the drawing, the shank 20 supporting the electrode 1 and pulls it down. Then, the arm 17 rotates in a horizontal plane by 180° and plugs the shank 20 of the electrode 1 into the electrode clamper 15a while moving upwardly. When the electrode clamper 15a clamps the shank 20 of the electrode 1, the arm 17 separates the shank 20 and is returned to its original position.

When the electrode 1 clamped by the electrode clamper 15a is to be returned to the magazine rack 18, the above described operation of the arm 17 is reversed.

Thus, a discharge machining can be performed by the electrode 1 clamped by the electrode clamper 15a according to the machining program preliminarily inputted to the numerical control device 10.

First, the electrode 1 and the workpiece 2 are arranged in facing relation to each other within the machining liquid 4 in the machining tank 3 and pulsed current is supplied from the pulse current generator 5 to the electrode 1 and the workpiece 2. With such pulse current, an intermittent discharge occurs in a machining gap between the electrode 1 and the workpiece 2 by which the workpiece 2 is machined. During the machining, the electrode 1 connected to the Z axis servo motor 9a through the lead screw 8a is moved vertically according to the instruction from the numerical control device 10.

Further, the tables 14b and 14c which are connected to the Y and X servo motors 9b and 9c through the lead screw 8c and the lead screw which is not shown, respectively, are moved in the Y and X directions according to the instruction of the numerical control device 10, so that horizontal relative position of the electrode 1 to the workpiece 2 can be changed arbitrarily.

The electrode 1 can be rotated in the C direction about the axis of the spindle head by the electrode angle regulator 19.

Therefore, by suitably controlling the servo motors 9a, 9b and 9c and the electrode angle regulator 19, a desired portion of the workpiece 2 can be machined to a configuration corresponding to that of the electrode 1.

In order to perform continuous machining by successively exchanging a plurality of different electrodes 1, it is necessary to preliminarily know the position of such electrode. FIG. 10a shows the workpiece 2 and a reference measuring member 90 provided on the magazine rack 18. A reference ball 91 is provided in the vicinity of the workpiece 2, for measuring the electrode position with respect to the workpiece 2. The reference measuring member 90 has roles of providing a reference for measuring a relative position of the workpiece 2 to the reference ball 91 and of providing a reference for measuring the position of each of the electrodes 1.

The position measurement of the respective electrode 1 will be described. First, a position alignment between the reference measuring member 90 and the reference ball 91 is performed as shown in FIG. 11 in which straight lines show rapid feeding of the reference ball 91 with respect to the reference measuring member 90 and undulated lines show low speed feeding of the reference ball 91 to eventually make in contact with the reference measuring member 90.

Then, as shown in FIG. 10b, an alignment of a first electrode 1A is performed by using the reference ball 91. Thereafter, an alignment of a second electrode 1B is performed as shown in FIG. 10c. These aligning operations are preliminarily programmed in the numerical control device 10 by an operator. That is, a position (in three dimensional X-Y-Z coordinates) and an angle C of the electrode for which the alignment is to be performed are assigned by the operator and results of measurements of the respective electrodes 1 are registered in the numerical control device 10 together with electrode numbers thereof.

With the movements of these members, a three dimensional position of the reference ball 91 can be measured.

In positioning each electrode 1, numerical values to be inputted to the numerical control device 10 may include those indicative of the size of electrode and reference points thereof. When the electrode 1 has a simple configuration such as shown in FIG. 12, for example, positions of faces Xa and Xb of the electrode in the X direction, faces Ya and Yb thereof in the Y direction and face Za thereof in the Z direction are picked up by the reference measuring member 90 in sequence starting from that shown in FIG. 13a to that shown in FIG. 13e.

In such conventional electric spark machine, there is a problem that the machine stops its automatic positioning operation when the operator makes a simple error of inputting correct electrode size to the numerical control device erroneously or inputting erroneous electrode size.

Further, the larger the number of electrodes to be used in a machining requires the longer the time necessary to perform the alignment operation.

For example, Japanese Kokai (P) 146638/1989 discloses an electric spark machine tool whose tool houses a memory capable of being preliminarily read in an information including diameter, length, amount of correction, duration of usage and times of usage of the tool, etc., and which can perform an automatic management of the tool duration. However, such machine tool has no automatic off-center correction for the tool, requiring a lot of time for alignment operation of the tool.

An object of the present invention is to provide an electrode for use in an electric spark machine, with which an automatic misalignment measurement of the electrode mounted on the electric spark machine tool becomes possible, resulting in a substantial improvement on the workability of the machine tool.

Another object of the present invention is to provide an automatic alignment device for positioning electrode correctly with respect to a workpiece.

Another object of the present invention is to provide an electric spark machine using such electrode.

SUMMARY OF THE INVENTION

According to an embodiment of the present invention, an electrode to be used in an electric spark machine tool is provided with recording means which records an electrode information including electrode number, its deviation from a reference and machining program, etc.

An alignment device for the electrode according to another embodiment of the present invention comprises a turntable for fixedly mounting the electrode having the recording means, a vertical drive mechanism for vertically moving, with respect to the electrode, a reference measuring member which is made in contact with the electrode to measure an amount of deviation or misalignment thereof from a reference, a horizontal drive mechanism for moving the reference measuring member with respect to the vertical drive mechanism and write means for writing, in the recording means, an amount of the misalignment of the electrode which is measured by the reference measuring member.

An electric spark machine tool according to another embodiment of the present invention comprises a magazine rack having a plurality of electrode storing portions for storing a corresponding number of different electrodes each having recording means storing the electrode information, an electrode exchanger for deriving a desired electrode from the magazine rack by reading the electrode number stored in the recording means thereof and attaching the electrode to a main shaft of the electric spark machine, misalignment read means for reading the amount of misalignment stored in the recording means and storing it in a memory, electrode position detector for detecting a position coordinates of the electrode mounted on the main shaft by means of the electrode exchanger, alignment means for obtaining, from the amount of misalignment read in from the memory, a correction distance measured from a temporary origin which is an electrode position coordinates detected by the electrode position detector at a time when the electrode is mounted on the main shaft of the machine and outputting a correction distance signal corresponding to the correction distance thus obtained to drive means of the respective shafts to move them, a true origin calculator for setting and outputting the position coordinates of the electrode measured by the alignment means as a true origin coordinates and machining program read/operate means for reading the machining program corresponding to the electrode number from the memory and controlling the drive means of the respective shafts using the true origin coordinates.

The recording means of each electrode stores the machining program which is read out and stored in the memory.

According to the first embodiment of the present invention in which each electrode has the recording means, it is possible to reliably transfer electrode information of an arbitrary electrode to the electric spark machine which mounts it.

In the second embodiment of the present invention, the operator's input of erroneous data or his erroneous input of correct data to the numerical control device can be prevented because detection of amount of misalignment and writing it in the numerical control device are performed automatically by the alignment device.

Further, in the third embodiment of the present invention in which the electric spark machine reads the amount of misalignment of the electrode from the recording means thereof and corrects it according thereto, there is no need of performing the steps of measuring the misalignment on the side of the electric spark machine, resulting in substantially improved workability of the machine. Further, since the recording means of the electrode stores the machining program, it is possible to reduce the memory capacity of the numerical control device correspondingly and to make the information management of the electrode derived from the magazine rack easier.

BRIEF DESCRIPTION OF THE DRAWINGS

FIGS. 10a to 10c show positional relations between a reference measuring member, a reference ball and a workpiece in measuring positions of electrode;

FIG. 11 shows a relation between the reference measuring member and the reference ball in correcting a misalignment;

DETAILED DESCRIPTION OF THE PREFERRED EMBODIMENTS

The present invention will be described with reference to embodiments shown in the accompanying drawings.

Figure 1:
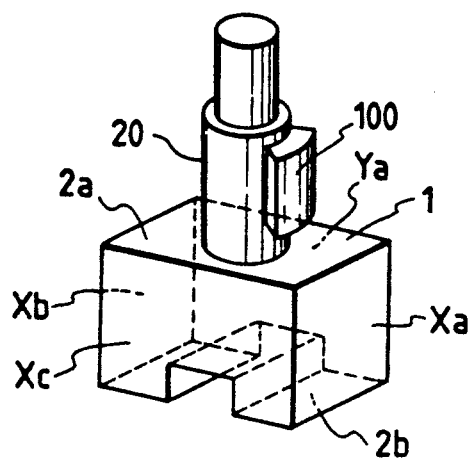
FIG. 1 is a perspective view of an embodiment of an electric spark machine according to the present invention.

FIG. 1 is a perspective view of an embodiment of an electrode for use in an electric spark machine. In FIG. 1, a reference numeral 1 depicts the electrode having a shank 20 integral therewith. A rewritable memory tag 100 is mounted on one side of an outer periphery of the shank 20 as recording means which has recorded preliminarily an electrode information including electrode number of the electrode 1, misalignment thereof from a reference and a machining program, etc.

Figure 2:
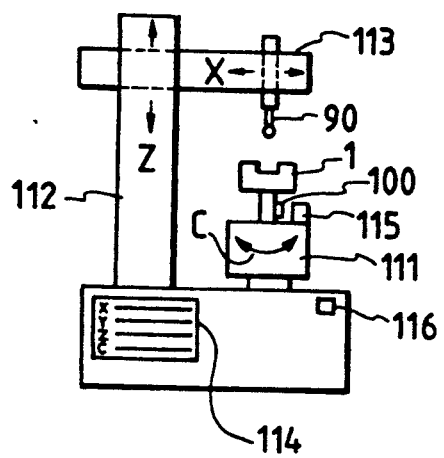
FIG. 2 shows a construction of an embodiment of an alignment device for an electrode of an electric spark machine, according to the present invention.

FIG. 2 shows, schematically, a construction of an embodiment of an alignment device for the electrode 1. The alignment device comprises a turntable 111 rotatable in a C direction and fixedly mounting the electrode 1, a vertical, that is, Z axis drive mechanism 112 for vertically moving a reference measuring member 90 which is adapted to be in contact with the electrode 1 to measure an amount of misalignment from a reference, a horizontal or X axis drive mechanism 113 for mounting the reference measuring member 90 and moving the reference measuring member 90 horizontally with respect to the Z axis drive mechanism 112, a counter 114 for indicating amounts of misalignment of the electrode 1 in the respective directions X, Y, Z and C with using the reference measuring member 90, write means 115 provided on the turntable 111 in facing relation to the memory tag 100 of the electrode 1 for writing the amount of misalignment of the electrode 1 measured by the reference measuring member 90 in the memory tag 100 and a write button 116 which is a switch for causing the write means 115 to write the misalignment amounts of the electrode 1 in four directions in the memory tag 100.

Figure 3:
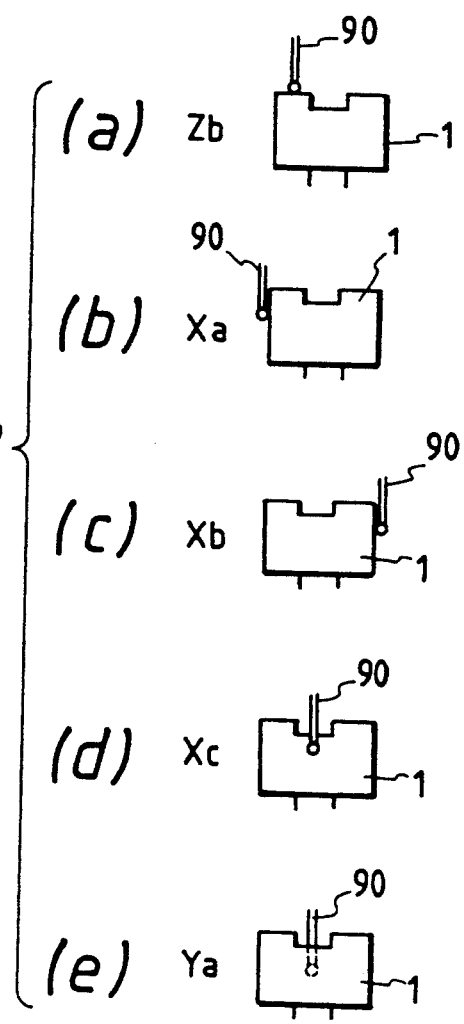
FIGS. 3a to 3e show the steps of misalignment detection for the electrode, respectively.

Operations of the alignment device starting from the measurement of the electrode misalignment to the writing thereof in the memory tag 100 will be described with reference to FIGS. 3a to 3e. First, the electrode 1 is set on the turntable 111. Then, the reference measuring member 90 is lowered by the Z axis drive mechanism 112 until it becomes in contact with a Zb face of the electrode 1 to measure a vertical travelling distance of the reference measuring member 90 and to indicate it on the counter 114 (FIG. 3a). Thereafter, the reference measuring member 90 is made in contact with an Xa face of the electrode 1 by operating the Z axis drive mechanism 112 and then the X axis drive mechanism 113 (FIG. 3b) and, similarly, with an Xb face of the electrode 1 by operating the Z axis drive mechanism 112 and the X axis drive mechanism 113 (FIG. 3c). The travelling distance of the reference measuring member 90 in the X direction thus obtained is indicated on the counter 114. Then, after the turntable 111 is rotated in the C direction by 90°, the Z and X drive mechanisms 112 and 113 are actuated again to make the reference measuring member 90 in contact with a Yb face of the electrode 1 (FIG. 3d) and, then, the Z and X drive mechanisms 112 and 113 are operated to make the reference measuring member 90 in contact with a Ya face of the electrode 1 (FIG. 3e) and the value in the Y direction thus measured is indicated on the counter 114.

The value in the C direction, that is, electrode angle, can be obtained by measuring rotation angle of the turntable 111 by turning it by an amount corresponding to the misalignment from a reference of the electrode configuration which is known from the measuring steps shown in FIGS. 3a to 3e.

An operator confirms the amounts of misalignment of the electrode 1 indicated on the counter 114 and depresses the write button 116 to cause the write means 115 to write the misalignments in the memory tag 100.

Thus, the alignment device for the electrode of the electric spark machine according to the present invention performs the detection and writing of the misalignments of the electrode 1 in four directions automatically, eliminating erroneous manual input of them.

Figure 4:
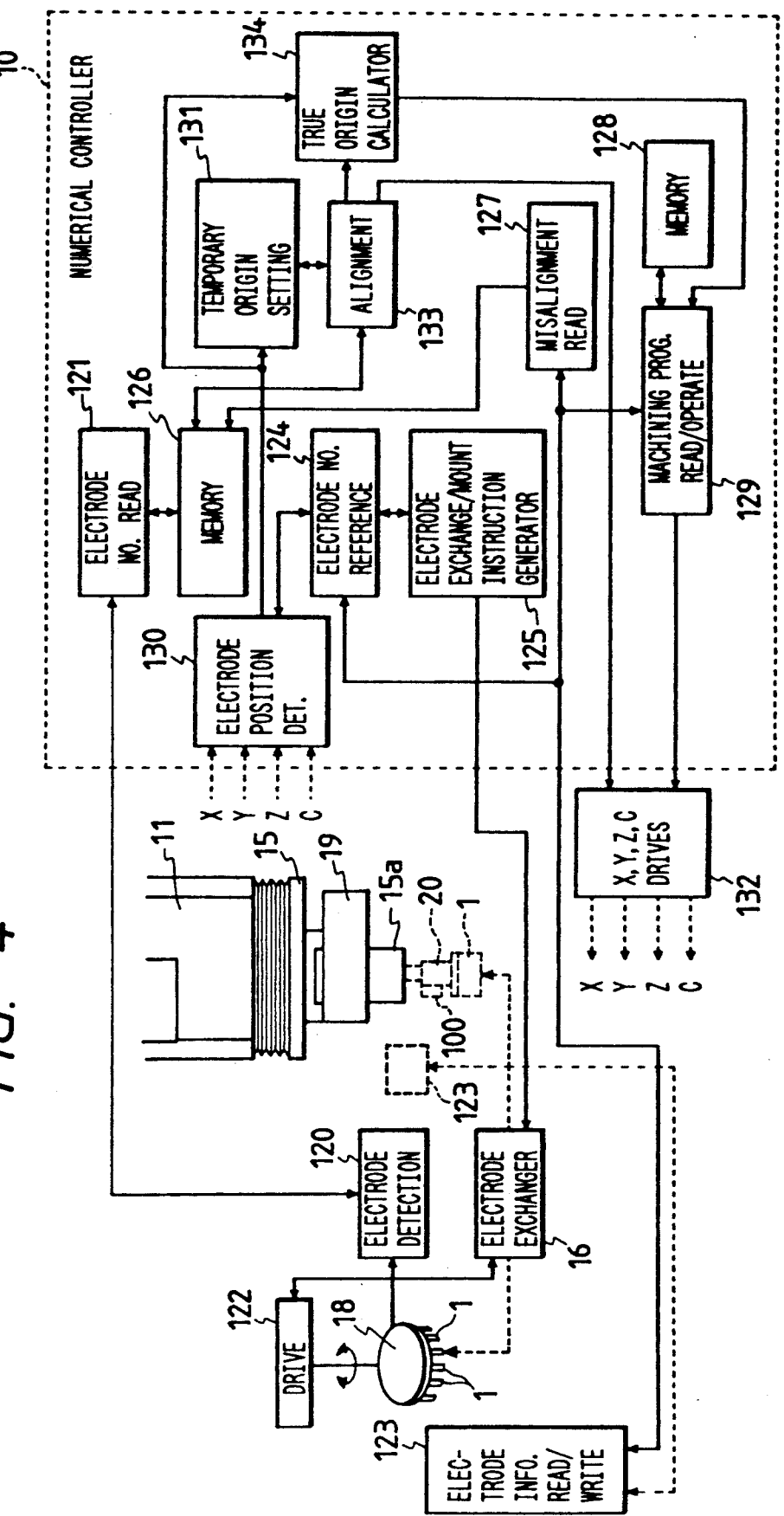
FIG. 4 is a block diagram of a control portion of an embodiment of an electric spark machine according to the present invention.
Figure 5:
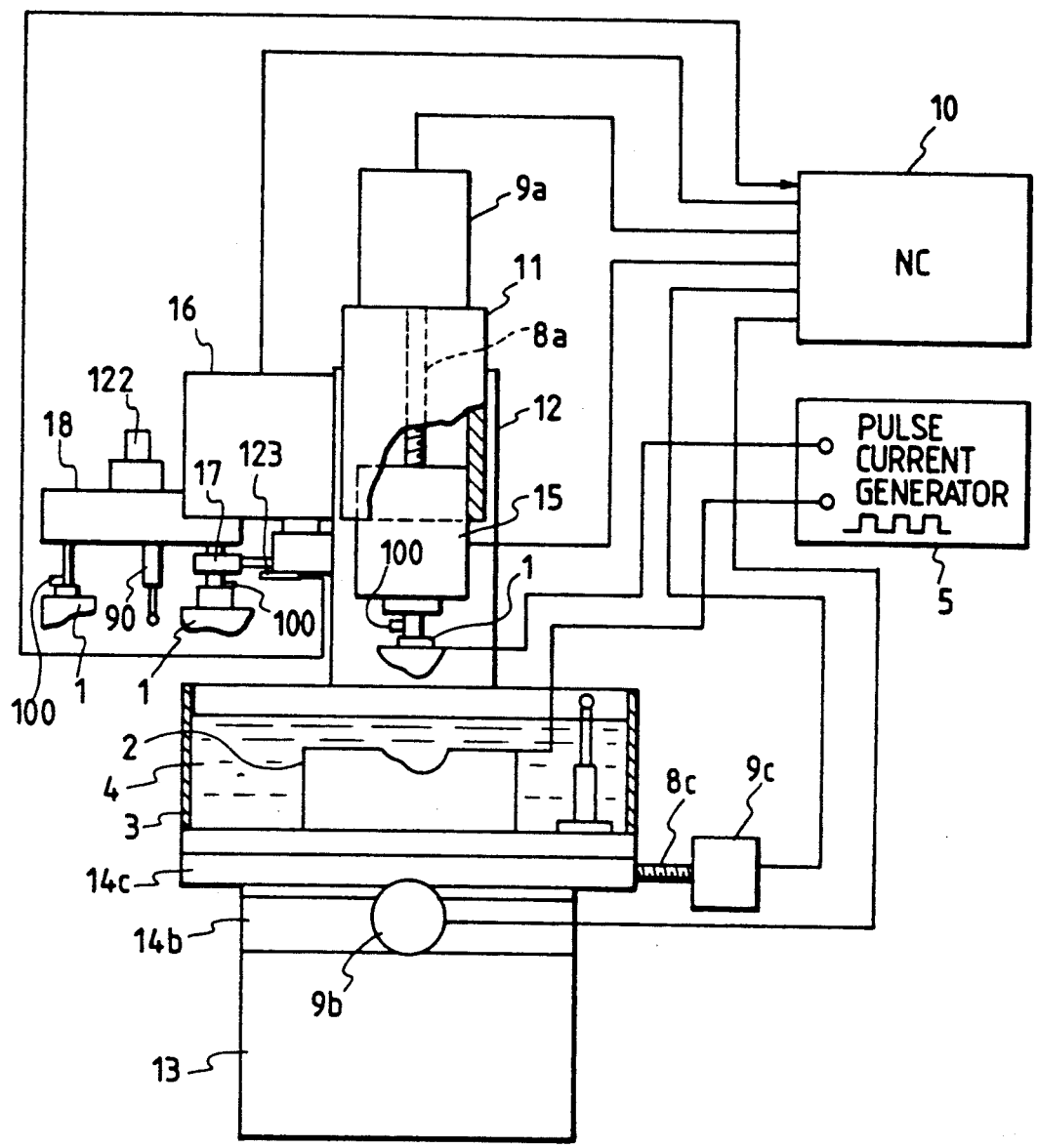
FIG. 5 shows a detailed construction of a hardware portion of the electric spark machine shown.
Figure 6:
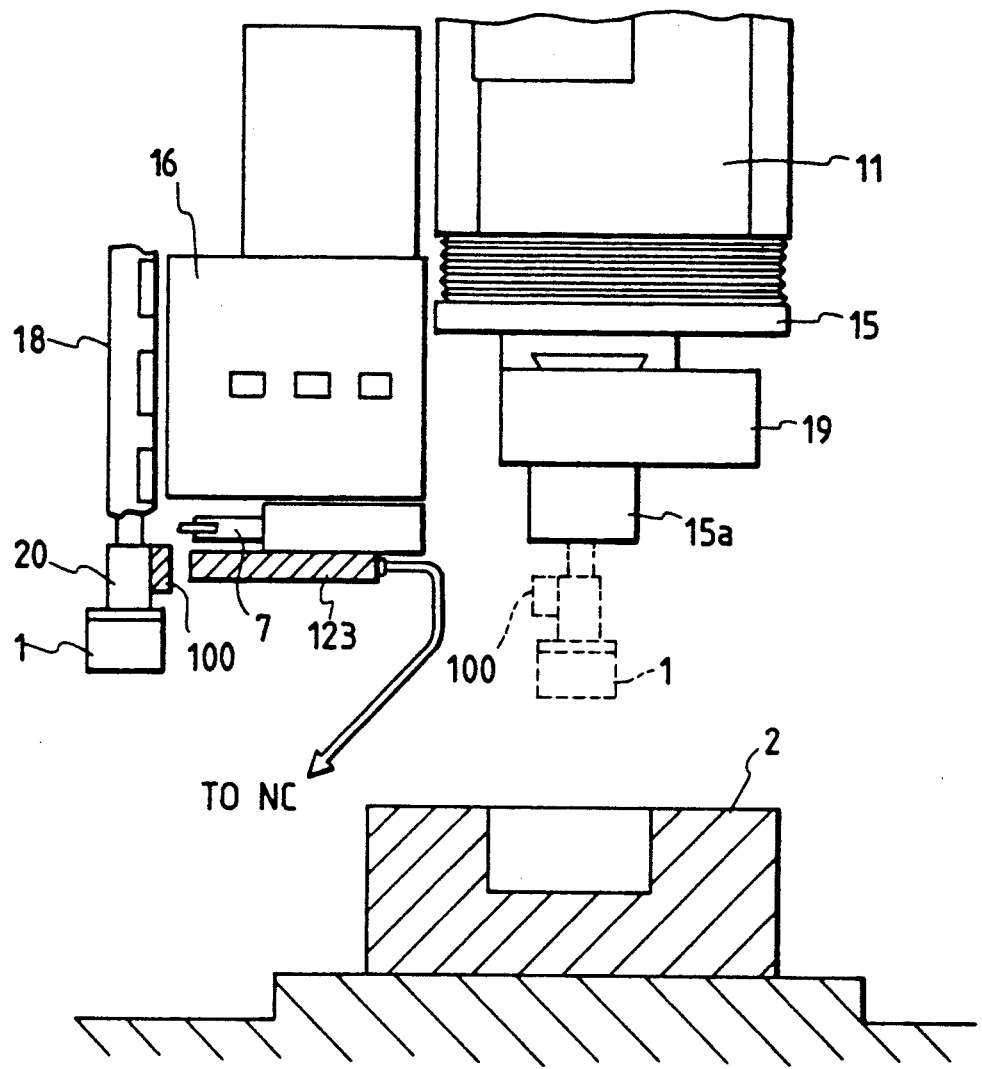
FIG. 6 is a side view of a main portion of the electric spark machine.

FIGS. 4 to 6 show another embodiment of the electric spark machine according to the present invention, in which FIG. 4 is a block diagram showing a construction of a control portion thereof. FIG. 5 shows a construction of a hardware portion thereof and FIG. 6 is a side view showing a detailed construction of a main portion thereof. In these figures, portions corresponding to those of the conventional machine are depicted by the same reference numerals, respectively, without detailed description thereof. Only portions related to the present invention will be described.

The electric spark machine shown in FIGS. 4 to 6 comprises a magazine rack 18 having a plurality of storing portions. Each portion stores a corresponding number of different electrodes 1 and has a memory tag 100 storing an electrode information including a number unique to the electrode, its amount of misalignment and a machining program, etc. Electrode detector means 120 detects an electrode 1 inserted into a corresponding storing portion of the magazine rack 18, and electrode number read means 121 reads the number of the storing portion of loaded electrode that is detected by the detector means 120 as being inserted. The read number is stored in a read memory 126. A magazine rack drive portion 122 for position the storing portion of the magazine rack corresponding to the preliminarily assigned number in an electrode handling position in which the electrode is inserted into or derived from the magazine rack. Electrode information read/write means 123 is arranged in a position at which the electrode information stored in the memory tag 100 of the electrode 1 can be read in. An electrode exchanger 16 transfers the electrode 1 between the magazine rack 18 and a main shaft of the electric spark machine, that is, between the magazine rack 18 and an electrode clamper 15a on the side of a spindle head 15. An electrode number referencing means 124 provides a read signal for reading the electrode number from the memory tag 100 of the electrode 1 positioned in the electrode handling position to the electrode information read/write means 123 and references the thus obtained electrode number with the above mentioned assigned number. An electrode exchange/mount instruction signal generator 125 provides an electrode exchange/mount instruction signal to the electrode exchanger 16 when the electrode number referencing means 124 decides a coincidence of these numbers, misalignment read means 127 responsive to the electrode exchange/mount instruction provides a read signal of the misalignment from the memory tag 100 of the electrode 1 in the electrode handling position in the electrode information read/write means 123 and stores the thus obtained misalignment in the memory 126. A machining program read/operate means 129 provides a read signal for reading the machining program from the memory tag 100 of the electrode 1 in the electrode handling position to the electrode information read/write means 123 and stores the thus obtained machining program in a memory 128. An electrode position detector 130 detects position coordinates of the electrode clamped by the electrode clamper 15a through the electrode exchanger 16 temporary origin sets means 131 sets coordinates of the electrode position detected by the electrode position detector 130 at the ,time the electrode is clamped as a temporary origin. Alignment means 133 for obtaining a correction distance from the temporary origin set by the temporary origin setting means 131 on the basis of the misalignment data read from the memory 126 and driving drive means 132 of the respective shafts by supplying correction signals corresponding to the correction distances thus obtained. True origin calculation means 134 sets coordinates of the position to which the electrode 1 is moved by the alignment means 133 as a true origin and supplies the true origin to the machining program read/operate means 129. The machining program read/operate means 129 controls the drive means 132 of the respective shafts on the basis of the machining program read from the memory 128 using the true origin coordinates set by the true origin calculation means 134.

Figure 7A:
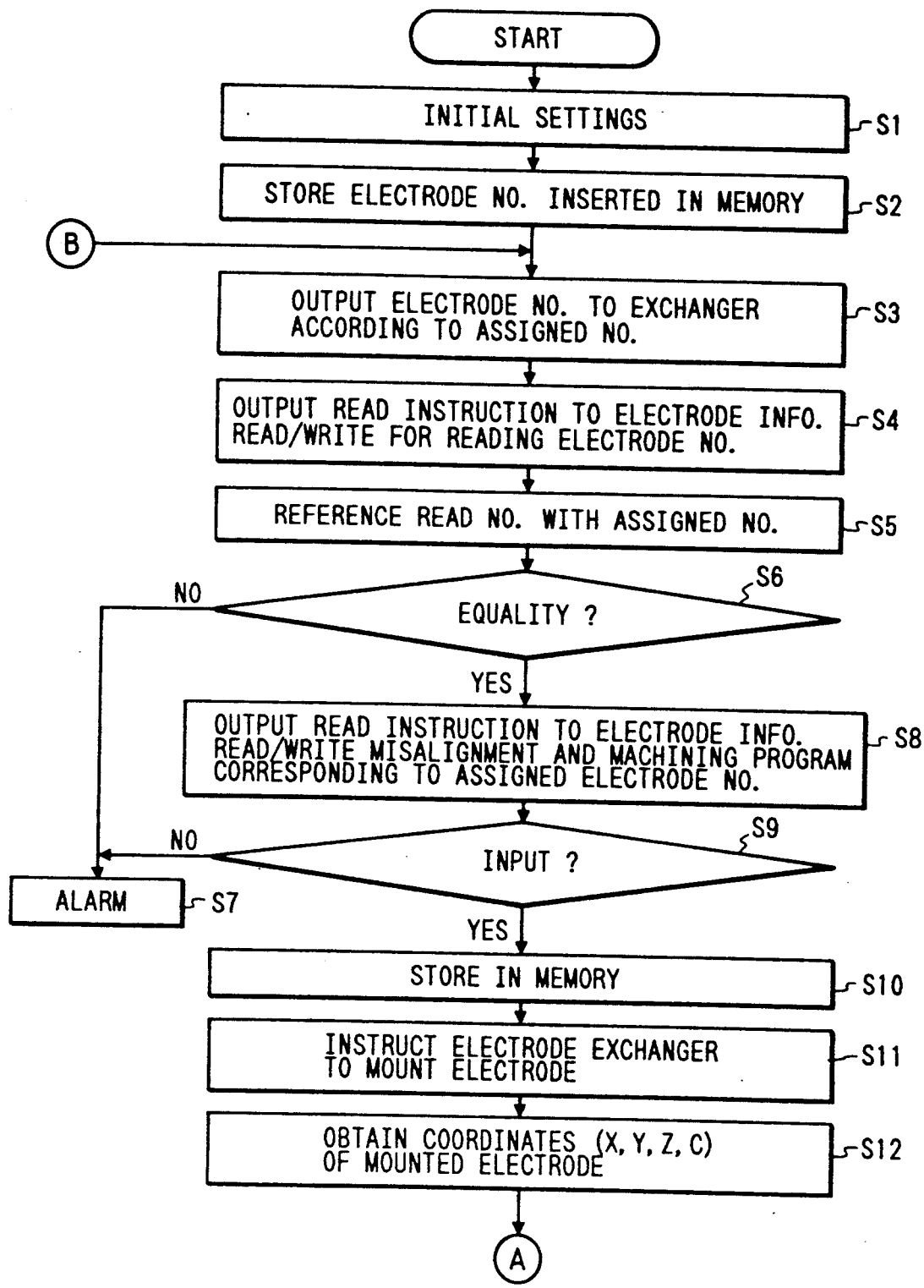
FIGS. 7a and 7b show a flowchart showing an operation of the electric spark machine shown in FIGS. 4 to 6.
Figure 7B:
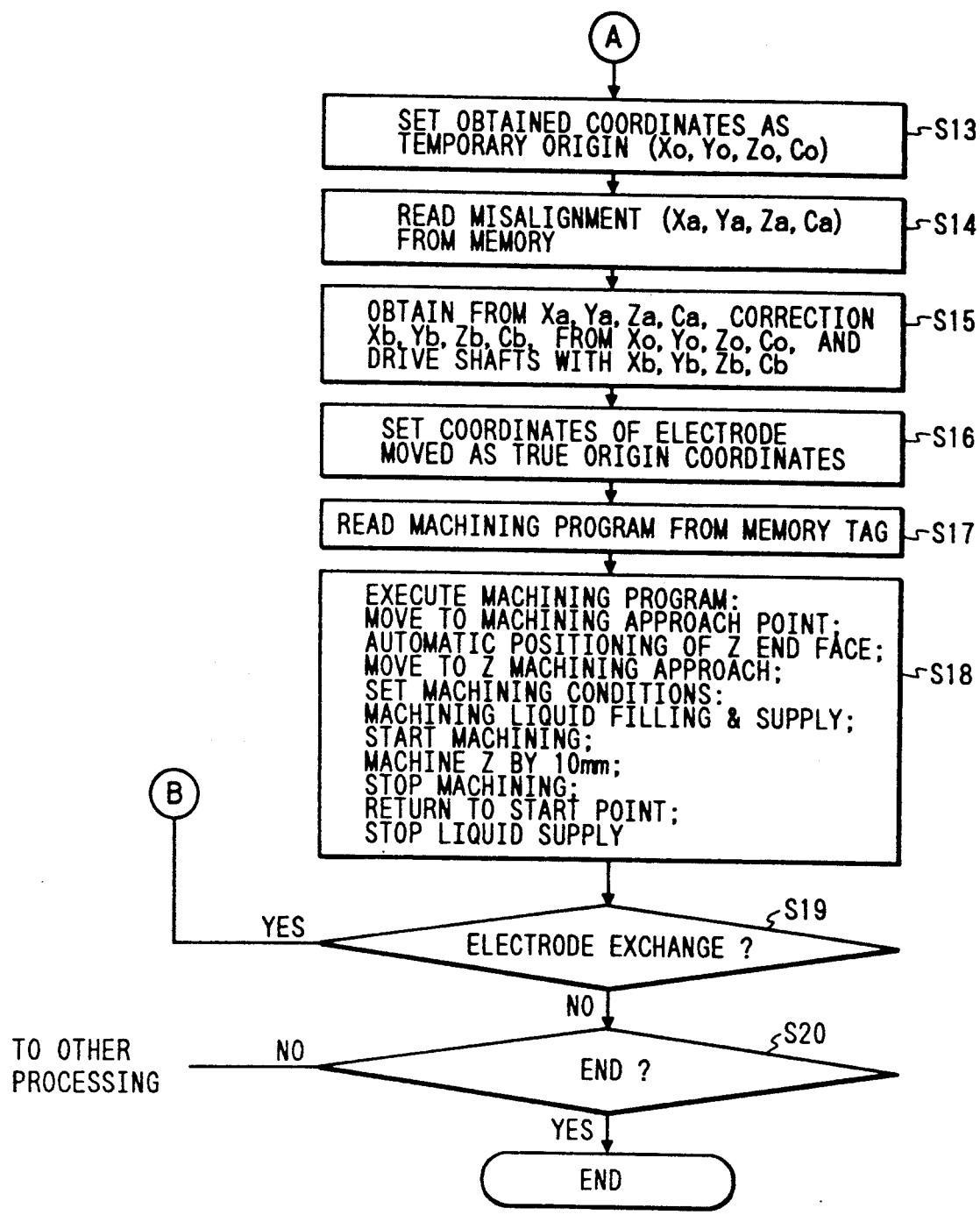
Figure 8:
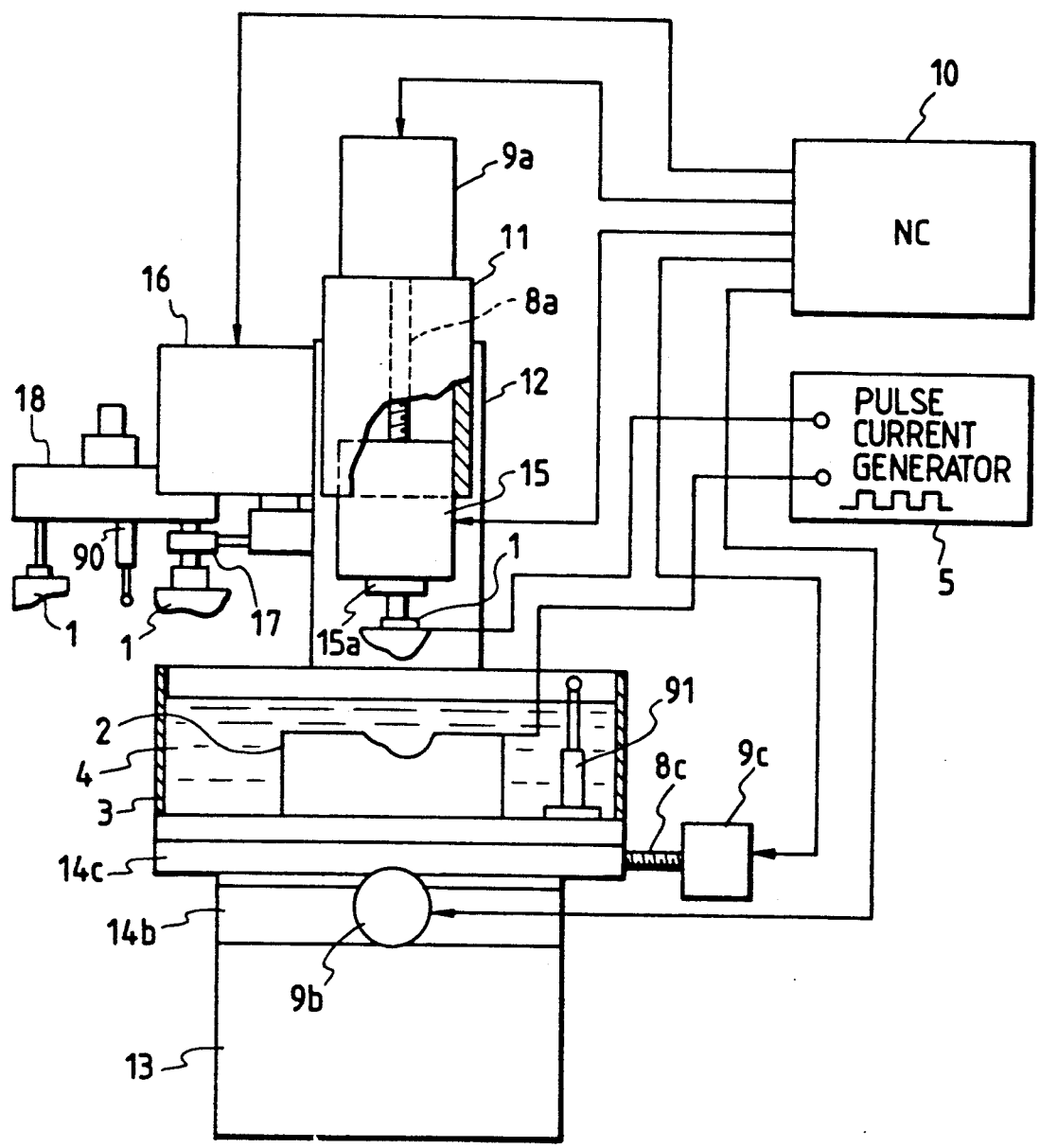
FIG. 8 shows a hardware portion of an example of a conventional electric spark machine.
Figure 9:
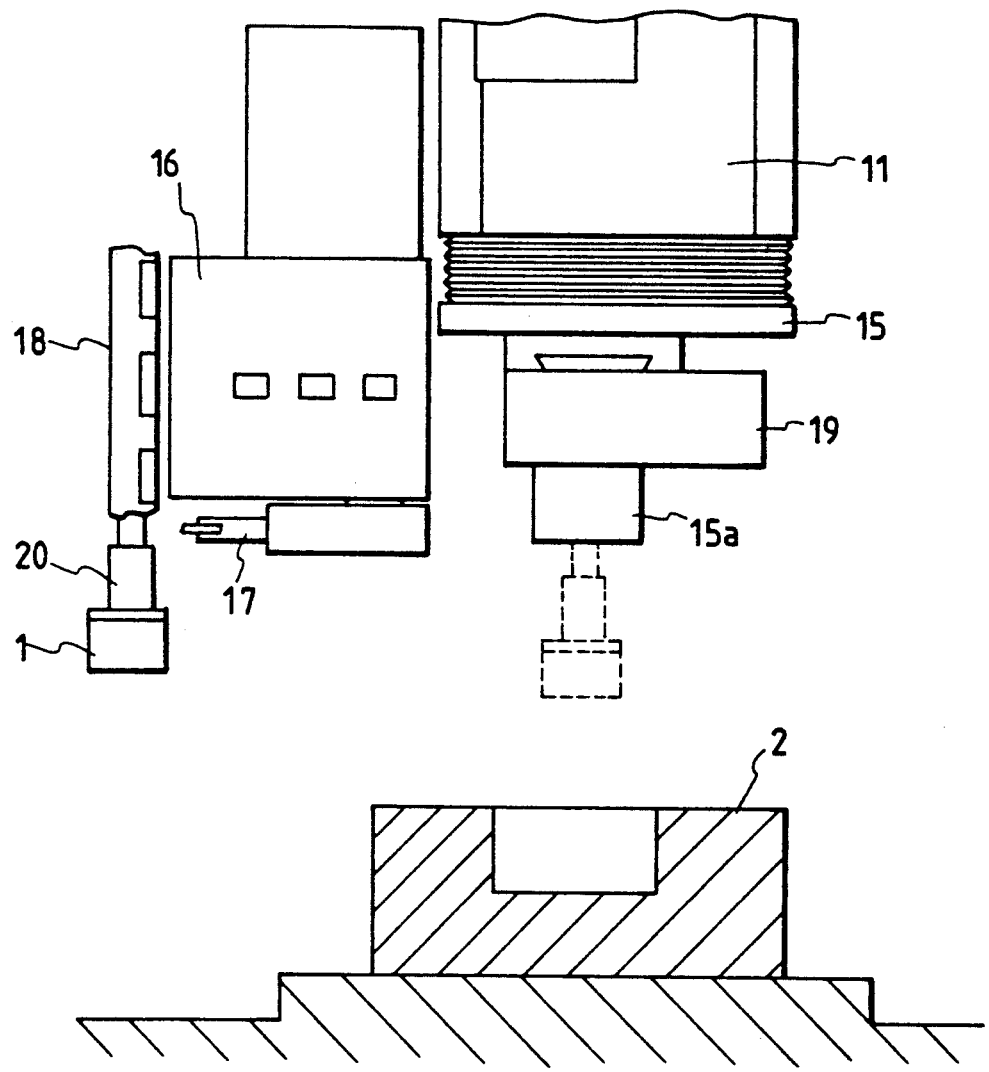
FIG. 9 shows a detailed construction of a main portion of the conventional electric spark machine.
Figure 12:
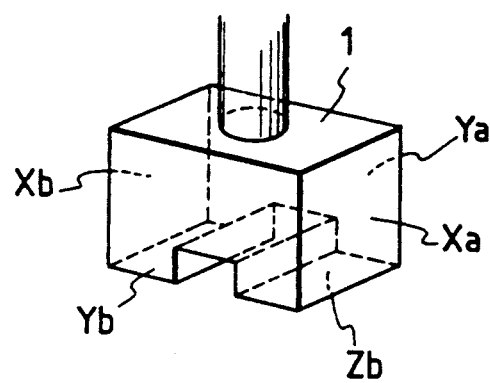
FIG. 12 is a perspective view of a conventional electrode.
Figure 13:
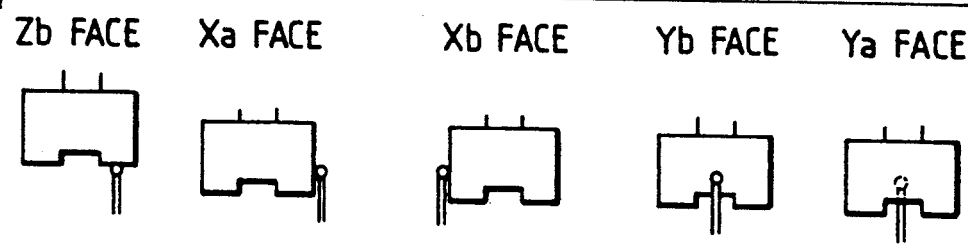
FIGS. 13a to 13e show the steps of positioning the electrode in detecting an amount of misalignment of the electrode.

An operation of the electric spark machine having the construction shown in FIGS. 4 to 6 will be described with reference to the flowchart shown in FIGS. 7a and 7b. Since the electric spark machining itself is the same as in the conventional machine, only the correction of misalignment of the electrode will be described. First, a plurality of different electrodes 1 each having the memory tag 100 storing preliminarily the electrode information including electrode number, misalignment and machining program, etc., as initial settings are inserted into corresponding storing portions of the magazine rack 18 (Step 1). When the insertion of the electrodes 1 is completed, the electrode detection means 120 sends to the electrode number read means 121 the number of the storing portion into which the electrode 1 is inserted. The electrode number read means 121 responds to the number of the storing portion from the electrode detection means 120 to store the number in the memory 126 as the electrode number (Step 2).

Then, the electrode exchanger 16 responds to an instruction number (assigned number) from the numerical control device 10 to cause the magazine drive portion 122 to move the storing portion corresponding to the assigned number in the electrode handling position (Step 3). At this time, the position of the electrode 1 derived therefrom is a position at which the electrode information read/write means 123 can read the electrode information stored in the memory tag 100 of the derived electrode 1.

When the derived electrode 1 reaches the electrode handling position, the electrode number referencing means 124 provides, to the electrode information read/write means 123, an instruction instructing reading of the electrode number from the memory tag 100 of the electrode 1 (Step 4), references the read electrode number with the assigned number (Step 5), determines whether the read electrode number and the assigned number are equal (Step 6) and performs an alarm processing when they are not equal (Step 7).

When it is decided in the Step 6 that these two numbers are equal, the misalignment read means 127 provides, to the electrode information read/write means 123, a signal instructing reading of the misalignment corresponding to the electrode number from the memory tag 100. Then machining program read/operate means 129 provides, to the electrode information read/write means 123, a signal instructing reading of the machining program corresponding to the electrode number from the memory tag 100 (Step 8). The electrode information read/write means 123 responds to the signals from the misalignment read means 127 and the machining program read/operate means 129 to read the misalignment and the machining program from the memory tag 100 and transfer them to the misalignment read means 127 and the machining program read/operate means 129.

The misalignment read means 127 and the machining program read/operate means 129 respond to the misalignment and machining program from the electrode information read/write means 123, respectively, (Step 9) to store the obtained misalignment in the memory 126 and the obtained machining program in the memory 128, respectively (Step 10).

Then, the electrode exchange/mount instruction generator 125 instructs the electrode exchanger 16 to exchange/mount the electrode 1 (Step 11). The electrode exchanger 16 responds to the instruction from the electrode exchange/mount instruction generator 125 to extend the arm 17 leftwardly to let it hold the electrode 1 and pull it down and then rotate the arm 17 in a horizontal plane by 180° and move it up to let it plug the electrode 1 in the electrode clamper 15a. Then when the electrode clamper 15a clamps the electrode 1, the electrode exchanger 16 causes the arm 17 to separate the electrode 1 and returns to the original position.

When the electrode clamper 15a clamps the electrode 1, the temporary origin setting means 131 obtains the coordinates (X, Y, Z, C) of the electrode at the time when the electrode is clamped, which is detected by the electrode detection means 130 (Step 12) and sets thus obtained electrode position coordinates as a temporary origin (Xo, Yo, Zo, Co) (Step 13).

With the temporary origin being set, the alignment means 133 reads amounts of misalignment (Xa, Ya, Za, Ca) from the memory 126 (Step 14) and obtains a correction distance Xb from the temporary origin Xo on the basis of the misalignment value Xa, a correction distance Yb from the temporary origin Yo on the basis of the misalignment value Ya, a correction distance Zb from the temporary origin Zo on the basis of the misalignment value Za and a correction distance Cb from the temporary origin Co on the basis of the misalignment value Ca and outputs these correction distances to the respective drive means 132 to move the respective shafts (Step 15).

Thereafter, the true origin calculator 134 obtains coordinates of the electrode 1 thus moved by the alignment means 133 from the electrode position detector 130 and sets it as the true origin coordinates (Step 16) and outputs it to the machining program read/operate means 129.

When the true origin coordinates is set, the machining program read/operate means 129 reads the machining program from the memory 128 (Step 17) and controls the respective drive means 132 according to the program using the true origin coordinates as the origin (Step 18).

When there is an electrode exchange/mount instruction after the step 18 (Step 19), the routine is returned to the step 3. When there is no electrode exchange/mount instruction, the routine is terminates (Step 20), completing the process.

The machining program in the step 18 corresponds to that for the electrode exchanged.

As described, according to the electric spark machine which reads the misalignment of the electrode from the memory tag 100 of the electrode and corrects the misalignment accordingly automatically, there is no need of measuring electrode misalignment on the side of the electric spark machine. Therefore, the workability of the electric spark machine is substantially improved. Since the memory tag 100 of the electrode stores the machining program for that electrode, it is possible to reduce the memory capacity of the numerical control device 10 and to facilitate a management of information of the electrode derived from the magazine rack.

Although, in the described embodiment, the recording means is described as the memory tag 100 and the content thereof is read by the electrode information read/write means 123 provided on the side of the electric spark machine in contactless manner by means of electromagnetic wave, other recording means than the memory tag may be used in the present invention. For example, the recording means may take in the form of bar-code seal which may be read optically or magnetically. Further, the recording means may be protrusion formed on the electrode, which may be directly detected mechanically.

It is, of course, possible to write necessary information in the memory tag through the electrode information read/write means 123.

Although, in the described embodiment, the reading of the electrode information from the memory tag is performed before the arm 17 holds the electrode at the electrode handling position, such reading of the information can be done at any position of the electrode 1 so long as the electrode information read/write means 123 can read the tag. The position of the information read/write means 123 may be any so long as it can read the memory tag.

We claim:

1. An electrode for use in an electric spark machine tool comprising:

rewritable recording means provided integrally with said electrode for storing electrode information, said electrode information including each of:

an electrode number that uniquely identifies said electrode;

misalignment information representing an amount of misalignment of said electrode with respect to a reference point and a machining program of said electrode.

2. The electrode claimed in claim 1, wherein said recording means comprises a memory tag attached to said electrode.

3. The electrode claimed in claim 1, wherein said recording means comprises a bar-code seal attached to said electrode.

4. The electrode claimed in claim 1, wherein said recording means comprises a protrusion formed on said electrode.

5. An alignment device for measuring a misalignment of an electrode for use in an electric spark machine, comprising:

a turntable for fixedly mounting said electrode thereto, said electrode having recording means integrally formed therewith for storing a corresponding electrode identification number, misalignment information and a machining program;

a reference measuring member which movably contacts said electrode to measure an amount of misalignment of said electrode from a reference point;

a vertical drive mechanism for moving said reference measuring member in a vertical direction;

a horizontal drive mechanism for moving said reference measuring member in a horizontal direction with respect to said vertical drive mechanism; and write means for writing an amount of the misalignment of said electrode measured by said reference measuring member in said recording means integrally formed with said electrode.

6. An alignment device according to claim 5, wherein the misalignment information represents an amount of misalignment of said electrode in X, Y, Z and C directions from a reference point.

7. An electric park machine comprising:

a magazine rack having a plurality of electrode storing portions for storing a corresponding number of different electrodes, each of said electrodes having recording means integrally formed thereon for storing electrode information, said electrode information including an electrode identification number, misalignment information and a machining program;

an electrode exchanger for identifying and removing a desired one of said electrodes from said magazine rack based on the electrode number stored on said desired electrode and mounting said electrode on a main shaft of said electric spark machine;

misalignment reading means for reading the misalignment information from said recording means of said desired electrode and storing said misalignment information in a memory;

electrode position detector for detecting position coordinates for said electrode mounted on said main shift by means of said electrode exchanger;

alignment means for obtaining a correction distance based on a temporary origin, which is identified by the electrode position coordinates detected by said electrode position detector at a time when said electrode is mounted, and based on the misalignment information read from said memory, said alignment means, said alignment means outputting a correction distance signal representing said measured correction distance driving means for driving respective shaft of said electric park machine to move said shafts based on said correction distance signal;

a true origin calculator for setting and outputting the position coordinates of said electrode measured by said alignment means as true origin coordinates; and machining program read/operate means for reading a machining program corresponding to the electrode number from said memory and controlling the drive means of said respective shafts using the origin coordinates set by said true origin calculator means as a true origin.

8. An electric spark machine according to claim 7, wherein the misalignment information represents an amount of misalignment of said electrode in X, Y, Z and C directions from a reference point.

* * * * *